US008032656B2

(12) United States Patent
Reid et al.

(10) Patent No.: US 8,032,656 B2
(45) Date of Patent: Oct. 4, 2011

(54) FAST HANDOVER USING SIP

(75) Inventors: Gidon M Reid, Devon (GB); Fernando Jover Aparicio, Ipswich (GB); Devinder Singh, Selangor (MY)

(73) Assignee: British Telecommunications public limited company, London (GB)

( * ) Notice: Subject to any disclaimer, the term of this patent is extended or adjusted under 35 U.S.C. 154(b) by 130 days.

(21) Appl. No.: 12/295,791

(22) PCT Filed: Mar. 30, 2007

(86) PCT No.: PCT/GB2007/001185
§ 371 (c)(1),
(2), (4) Date: Oct. 2, 2008

(87) PCT Pub. No.: WO2007/113524
PCT Pub. Date: Oct. 11, 2007

(65) Prior Publication Data
US 2009/0177785 A1 Jul. 9, 2009

(30) Foreign Application Priority Data

Apr. 3, 2006 (MY) ................................ PI 20061499
Jul. 12, 2006 (EP) ..................................... 06253649

(51) Int. Cl.
*G06F 15/173* (2006.01)

(52) U.S. Cl. ........ 709/244; 709/202; 709/206; 709/207; 709/217; 709/228; 709/231; 709/249; 370/331; 379/60; 455/32.2; 455/436; 455/439; 455/442

(58) Field of Classification Search .................. 709/202, 709/206, 207, 217, 228, 231, 244, 249; 370/331; 455/32.2, 436, 439, 442; 379/60
See application file for complete search history.

(56) References Cited

U.S. PATENT DOCUMENTS
6,940,835 B2 * 9/2005 Reza et al. ..................... 370/331
(Continued)

FOREIGN PATENT DOCUMENTS
EP  1 578 080  9/2005
(Continued)

OTHER PUBLICATIONS
Vali, D. et al., "A SIP-based method for intra-domain handoffs", Vehicular Technology Conference, pp. 2068-2072, (Oct. 6-9, 2003).
(Continued)

*Primary Examiner* — Michael Won
(74) *Attorney, Agent, or Firm* — Nixon & Vanderhye P.C.

(57) ABSTRACT

A method of handling a data stream during a handover in a communications network comprising a first user agent having a fixed address, a proxy server and a second user agent, said method comprising the steps of: mapping at the proxy server the fixed address with a dynamic network address allocated to the first user agent; sending a request by the first user agent to the second user agent for a data stream; generating by the second user agent in response to the request a plurality of messages each comprising part of the data stream requested and the fixed address of the first user agent, wherein the message is a session initiation protocol message, and sending the messages to the proxy server; receiving the messages at the proxy server and determining the mapped dynamic network address corresponding to the fixed address in the message, and forwarding the messages to the determined dynamic network address; and when the first user agent is allocated a new dynamic network address, replacing by the proxy server the mapped dynamic network address with the new dynamic network address and forwarding the received messages to the new dynamic network address.

20 Claims, 5 Drawing Sheets

U.S. PATENT DOCUMENTS

| | | | |
|---|---|---|---|
| 7,046,647 B2 * | 5/2006 | Oba et al. | 370/331 |
| 7,184,418 B1 * | 2/2007 | Baba et al. | 370/331 |
| 7,441,032 B2 * | 10/2008 | Costa Requena | 709/225 |
| 7,656,895 B2 * | 2/2010 | Burne et al. | 370/465 |
| 7,852,809 B2 * | 12/2010 | Oberle et al. | 370/331 |
| 2003/0204629 A1 * | 10/2003 | Sambandam | 709/247 |
| 2008/0137611 A1 * | 6/2008 | Miao et al. | 370/331 |
| 2008/0175253 A1 * | 7/2008 | Rahman et al. | 370/395.52 |
| 2008/0259870 A1 * | 10/2008 | Olvera-Hernandez et al. | 370/331 |

FOREIGN PATENT DOCUMENTS

| | | |
|---|---|---|
| GB | 2 418 566 | 3/2006 |

OTHER PUBLICATIONS

Banerjee, N. et al., "SIP-Based Mobility Architecture for Next Generation Wireless Networks", Pervasive Computing and Communications, pp. 181-190, (Mar. 8-12, 2005).

International Search Report for PCT/GB2007/001185, mailed Oct. 8, 2007.

* cited by examiner

FAST HANDOVER USING SIP

This application is the U.S. national phase of International Application No. PCT/GB2007/001185, filed 30 Mar. 2007, which designated the U.S. and claims priority to Malaysia Application No. PI20061499, filed 3 Apr. 2006, and Europe Application No. 06253649.5, filed 12 Jul. 2006, the entire contents of each of which are hereby incorporated by reference.

FIELD OF THE INVENTION

This invention relates to a method of handover of data stream in a mobile communications network, in particular a method of handover of real-time data using session initiation protocol messages.

BACKGROUND TO THE INVENTION

Communications networks that provide a user with mobile data access are commonplace today. For example, IEEE 802.11 (Wi-Fi) networks can provide an authorised user with network access in the home, in the office, or even in a public place without the need for a permanent fixed connection. Whilst networks such as Wi-Fi allow a user a fair degree of freedom to roam to wherever there coverage and still maintain a network connection, there are many problems associated with trying to provide seamless data access whilst moving between coverage areas or networks. One of these relates to the handover of active data sessions.

To illustrate this problem, let us consider the following example. A user with a laptop connects to a Wi-Fi hotspot served by particular access points, and is allocated an Internet Protocol (IP) address. The user then roams to a different part of the hotspot covered by a different access point. The connection with the first access point will be lost, as will the original IP address, and a new connection will be established with the second access point and a new IP address will be assigned. Indeed, a change in IP address will be necessary whenever a user moves from one IP subnet to another IP subnet, irrespective of whether there is a change of access points. If the laptop was engaged in an active data session with the network, for example whilst downloading a multimedia file from a remote data source, then that session will be interrupted when the first connection is terminated. However, resumption of the multimedia download that was occurring before handover does not automatically occur when the laptop reconnects to the network, as the change in IP address requires a new session to be created and the data routed from the data source to the new IP address. Without this; the data source will only have the original IP address to send data to and thus transmissions to this IP address will never reach the laptop.

One protocol that has been suggested to solve this problem is the session initiation protocol (SIP), which can be adapted to handle handover's between networks.

SIP is an application-layer signalling protocol developed by the Internet Engineering Task Force (IETF) for initiating, modifying, and terminating real-time user sessions over an IP network. SIP is a signalling protocol that enables one user device to open a session with another user device and to negotiate the parameters for the session. The actual data to be exchanged, be it audio, video or multimedia content, during the session between the user devices is done using an appropriate transport protocol. In many cases, the transport protocol is RTP (real time transport protocol). The session description protocol (SDP) is used by SIP to define the format and parameters relating to the (RTP) data session.

Under SIP, a server wishing to send data to a user device first needs to establish a session with that device using SIP. This is done by sending an SIP Invite message to the universal resource indicator (URI) associated with the user device, which is a fixed address of the format "sip:user@domain". This message is sent via a SIP proxy server, which maps it onto the actual IP address of the user device and forward the message on accordingly. Once the user device accepts the invitation, a RTP session is opened, which allows the server to send data directly to the user device according to its IP address negotiated during the session set-up process.

Under SIP, when a user device moves to a new location and undergoes handover, any open data session with a data server will be terminated and re-registration of the user device using the new IP address occurs with the SIP registrar server. The user device then notifies the data server of the new IP address, so that a new RTP session can be set up to the new IP address. Otherwise any restarted RTP session will send data to the old IP address. This process is illustrated in the message flow diagram of FIG. 2, steps 226 to 236, which is described in more detail later.

This process of handover using SIP, whilst effective, is fairly slow. RTP sessions need to be terminated and restarted every time there is a change in IP address, which is time consuming. In particular, the process of creating a new SIP Invite message to notify the data server of the new IP address takes time, as does the sending of it and the processing by the SIP stack at the data server to extract the new IP address in the message. The new IP address is then passed to the application interface in the data server, which in turn passes it to the application that is sending the data to the user device for creating a new RTP session. A new RTP session is then finally created. All this takes time, so when a user device moves to a new location, after the IP address has changed, but before the change is picked up by the application in the data server sending the data, data can be lost from the original RTP session sending data to the old IP address. This can result in noticeable interruptions to real-time services such as a voice call or video streaming.

SUMMARY OF THE INVENTION

It is the aim of embodiments of the present invention to address one or more of the above-stated problems.

According to one aspect of the present invention, there is provided a method of handling a data stream during a handover in a communications network comprising a first user agent having a fixed address, a proxy server and a second user agent, said method comprising the steps of:

(i) mapping at the proxy server the fixed address with a dynamic network address allocated to the first user agent;

(ii) sending a request by the first user agent to the second user agent for a data stream;

(iii) generating by the second user agent in response to the request a plurality of messages each comprising part of the data stream requested and the fixed address of the first user agent, wherein the message is a session initiation protocol message, and sending the messages to the proxy server;

(iv) receiving the messages at the proxy server and determining the mapped dynamic network address corresponding to the fixed address in the message, and forwarding the messages to the determined dynamic network address; and (v) when the first user agent is allocated a new dynamic network, address, replacing by the proxy server the mapped dynamic network address with the new dynamic network address and forwarding the received messages to the new dynamic network address.

In preferred embodiments, the dynamic network address is an IP address, and the new dynamic network address results from the first user agent moving from a first subnet to a second subnet. This may be caused by a change in location.

Each message generated is typically a SIP MESSAGE message, which comprises a message header and a message body. The data stream is broken down into individual packets or components if too large to be included in a single message, and is inserted into the message body. The fixed address, which may be a SIP URI, is located in the message header.

The request message may be a SIP INVITE message, and include in the header a call identifier. This same call identifier is included in the subsequently generated messages carrying the data stream.

The first user agent can then parse each message received from the proxy server in dependence on the call identifier in the message. As a result of the call identifier matching up with the one used in the original request, the first user agent knows the format of the message (one having a data stream embedded) and can parse it accordingly.

Each generated message may also include a sequence number to indicate a preferred order for the message to be processed by the first user agent.

In a preferred embodiment, the first user agent maintains the first dynamic network address until the second dynamic network address has been allocated and registered with the proxy server. This describes a "make or break" scenario where a user agent detects that a handover is possible and "makes" a new connection before "breaking" the old connection to ensure a smoother handover.

In the above examples, the first and second user agents may be SIP devices, such as SIP phones, SIP enabled laptops and SIP content servers.

Thus, the embodiments of the present invention overcome the problem of the delay in restarting an RTP session after handover in a network by utilising modified SIP messages to carry the data, and handling these messages in the manner described. So, when a user agent changes IP address and has to re-register with a proxy server, the invention negates the need to generate and send a new a SIP INVITE message to the other user agent or content server to inform it of a change in IP address for use in a-new RTP session. This is because the user agent is using a modified SIP message to carry the data, with all the SIP messages addressed to the first user agent using its SIP URI, which remains constant even after moving to a IP address. The SIP messages are routed via the proxy server, which following re-registration is aware of the change in IP address, and routes the SIP messages carrying the data stream accordingly.

Embodiments of the present invention negate the need for separate INVITE messages to inform the content server of the new IP address, as the data being streamed is no longer being transferred directly using RTP or some other similar peer to peer transport protocol.

Furthermore, the content server does not have to alter its processing before and after handover, unlike with RTP. The SIP proxy server needs no modification over existing SIP proxy servers, as SIP messages embedded with data content can be handled like a normal SIP message. The only modifications needed are to the SIP stack and some other modules in the user agent endpoints.

Embodiments of the invention provide more control over the data being streamed, as signalling and transport data is merged. This also makes charging for transfer of data easier to manage as it is more transparent to the network.

Security is also increased, as anonymity of the user agent is maintained as no IP addresses are relayed to the other user agent. It is even possible to register a temporal URI from the proxy/registrar and use that to ensure even greater anonymity.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples.

The invention is not, however, limited to such examples.

Figure 1:
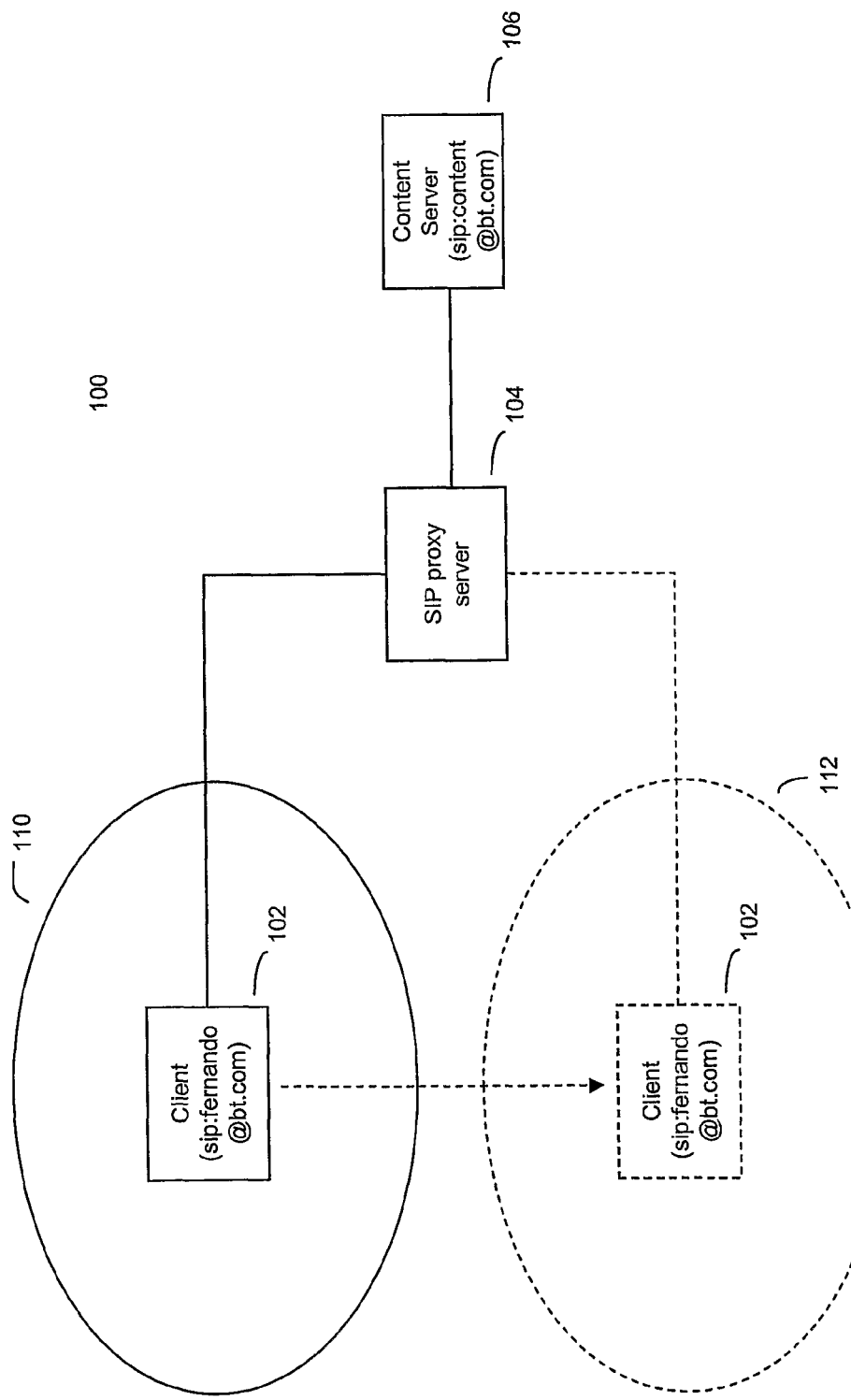
FIG. 1 is a network diagram illustrating a SIP client roaming between subnets.

FIG. 1 illustrates one embodiment of the present invention with a network 100 comprising a SIP client 102, a SIP proxy server 104 and a SIP content server 106. The network 100 may be a Wi-Fi network, though a person skilled in the art will appreciate that embodiments of the present invention will apply to other network access methods.

In this example, the content server 106 is a video streaming server and the client 102 may be a PDA or laptop. These "endpoints" can be varied and are typically based on standard network entities adapted to operate using SIP using a SIP client, such as a SIP phone. Thus, a normal laptop installed with a SIP client application can utilise SIP for establishing and terminating a communication session. In this example, the client 102 has a universal resource indicator (URI) of "sip:fernando@bt.com". The content server 106 has a URI of "sip:conent@bt.com".

The SIP proxy server 104 is used to route requests from one user agent, such as the content server 106, to the location of another user agent, such as the client 102. The SIP proxy server 104 also performs other functions such as authentication of the client 102.

The network 100 comprises two subnets: subnet_A 110 and subnet_B 112. Subnet_A 110 may be served by one Wi-Fi access point, and subnet_B 112 may be served by another access point. The content server 106 provides services such as audio and video streaming and downloads. When the client 102 moves from one subnet to the other, a new IP address is assigned to the client 102, and the client 102 as to re-register the new IP address with the SIP proxy server. This process of moving location and being assigned a new IP address is commonly referred to as handover. If the client 102 was engaged in a data session with the content server 106 before handover, then that data session will effectively be terminated once the client 102 moves to a new IP address, so after handover the client 102 has to notify the content server 106 of its new IP address in order to re-establish the data session. The method used to re-establish a data session under SIP following handover from one subnet to another will now be described in more detail with reference to FIG. 2. References in FIG. 2 to the elements found in FIG. 1 are made using like reference numerals.

Figure 2:
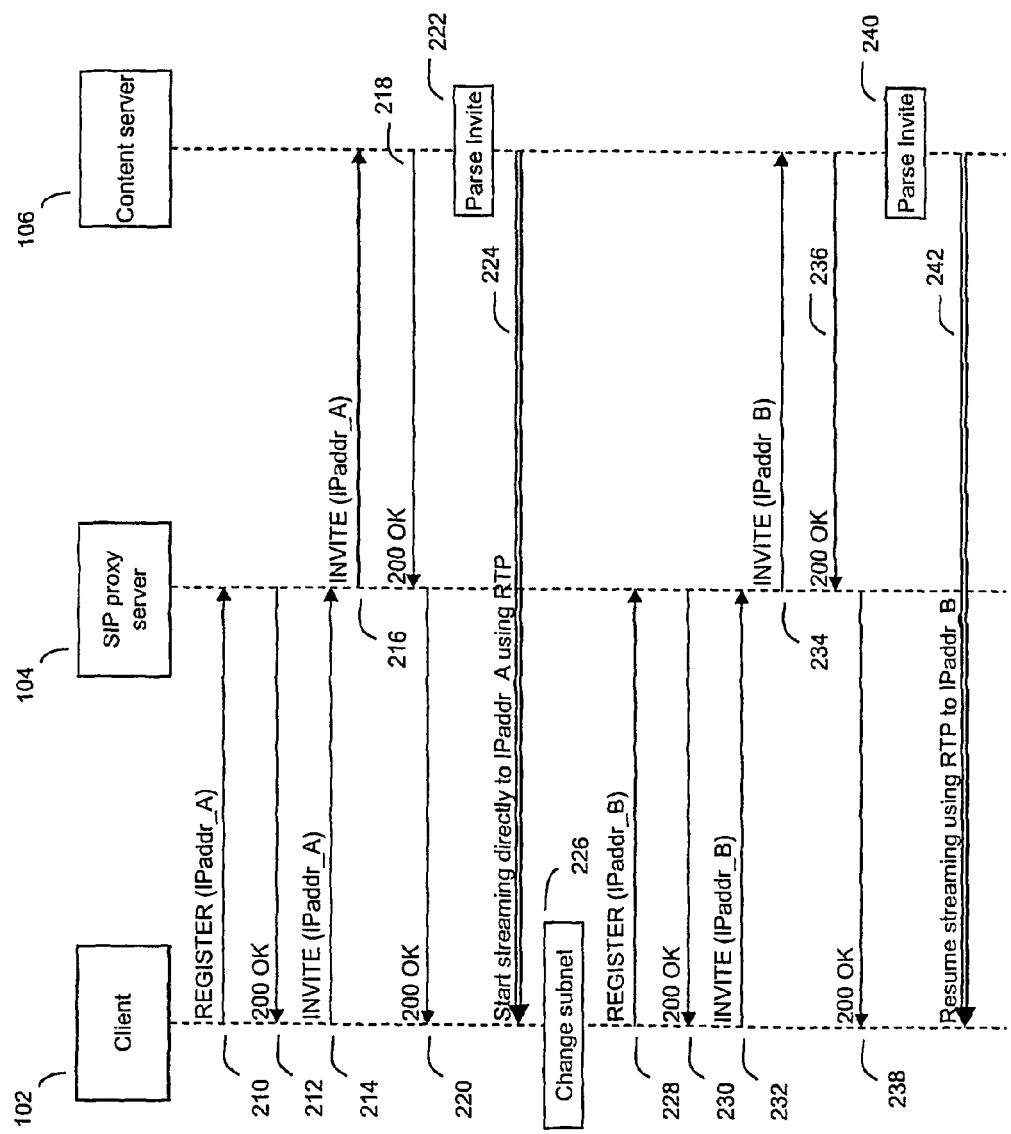
FIG. 2 is a message flow diagram of SIP based handover in the prior art.

FIG. 2 illustrates the steps involved in first establishing a session between the client 102 and the content server 106, to stream a multimedia file from the content server 106, and then the steps following a handover, caused by a change in location for example.

The client 102 starts off in subnet_A 110, and is allocated an IP address "IPaddr_A" by the access point serving subnet_A 110. Then, in step 210, the client 102 sends a SIP REGISTER message to the SIP proxy server 104 to register the IP address with the SIP registrar. The SIP registrar (not shown in the figures) is responsible for maintaining information on user agents' locations and mapping their SIP URIs against each of their allocated IP addresses. The SIP registrar is typically co-located with the SIP proxy server 104, though in some cases it may reside in a separate server. For the sake of simplicity, it will be assumed that the SIP proxy server 104 includes the functionality of a SIP registrar.

Following receipt of the SIP Register message in step 104, the SIP proxy server 104 maps the SIP URI of the client "sip:fernando@bt.com" with the client's current IP address "IPaddr_A". The SIP proxy server 104 then returns a SIP 200 OK message in step 212 to the client 102.

The client 102 then contacts the content server 106 to stream some video or audio data from the content server 106. The client 102 does so by sending a SIP INVITE message to the content server 106, which goes via the SIP proxy server 104 in step 214. The SIP INVITE message contains the IP address of the client 102 "IPaddr_A". The content server 106 responds to the SIP INVITE message forwarded by the SIP proxy server 104 in step 216 with a SIP 200 OK message in step 218. This is received by the SIP proxy server 104 and forwarded to the client 102 in step 220.

Also, as soon as the content server 106 receives the SIP INVITE message, the SIP stack inside the content server 106 parses the INVITE message to extract the IP address of the client 102, together with other data included in the SDP portion of the message body, which are then used to establish an RTP session. This is shown in step 222. The content server 106 sets up an RTP session directly with the client 102 (a peer to peer connection in effect), which it uses to start streaming the content requested by the client 102 as shown in step 224.

Whilst data is still being transferred from the content server 106 to the client 102, the client 102 moves location, and more importantly, changes subnet from subnet_A 110 to subnet_B 112 in step 226. The result of the change to subnet_B 112 is that the client 102 is allocated a new IP address "IPaddr_B". This change in IP address is communicated to the SIP proxy server 104 in step 228 through a SIP REGISTER message. The SIP proxy server 104 responds with a SIP 200 OK message in step 230.

The client 102 then also has to notify the content server 106 that its IP address has changed, otherwise the content server 106 will continue to send data using the RTP session established in step 224 to the client's original IP address. The client 102 notifies the content server 106 with a new SIP INVITE message sent via the SIP proxy server 104 in step 232. The new SIP INVITE message contains the new IP address "IPaddr_B" of the client 102. The content server 106 responds to the SIP INVITE message forwarded by the SIP proxy server 104 in step 234 with a SIP 200 OK message in step 236. This is received by the SIP proxy server 104 and forwarded to the client 102 in step 238.

Furthermore, as soon as the content server 106 receives the new SIP INVITE message in step 234, the SIP stack inside the content server 106 parses the message to extract the new IP address of the client 102, together with the SDP data from the message body, which are then used to establish a new RTP session in step 240. This information is passed from the SIP stack in the content server 106 to the application interface in the content server, so that the application streaming the data can establish a new RTP session to replace the one set-up in step 224, which will up to now have been sending data to the old IP address. The new RTP session resumes data transfer from where the old RTP session terminated as is shown in step 242.

It is clear from the steps above that between steps 226 and 242, from where the client 102 changes subnet and thus IP address to when a new RTP session is established, data transferred in the original RTP session to the original IP address will be lost.

Figure 3:
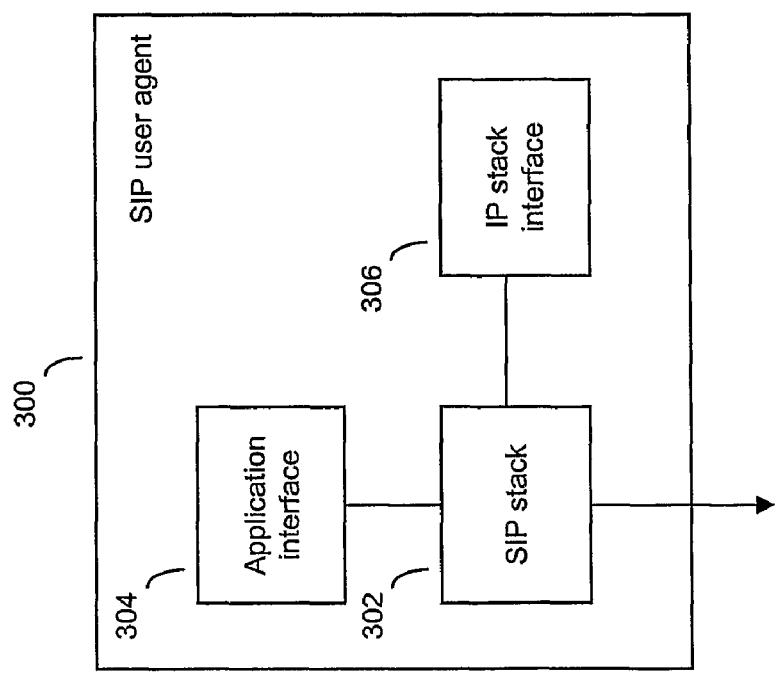
FIG. 3 is a diagram illustrating the components of a SIP user agent in an embodiment of the present invention.

FIG. 3 illustrates a SIP user agent 300 in an embodiment of the present invention, such as the client 102 or the content server 106. The SIP user agent 300 includes a SIP stack 302, an application interface 304 and an IP stack interface 306.

The SIP stack 302 is a functional module used to parse and generate SIP messages received by the SIP user agent 300. The application interface 304 is used to pass information from application running in the SIP user agent 300 to the SIP stack 302 for generating SIP messages according to embodiments of the present invention. The IP stack interface 306 communicates with the IP stack of the operating system, of the SIP user agent 300 and is used to determine when there is a change in the IP address of the SIP user agent 300 and to notify the SIP stack 302 of that change, so that re-registration of the user agent can take place as necessary. The IP stack interface 306 may also receives other network information, such as IEEE 802.21 related information which can be used to predict and effect handovers in a network.

Figure 4:
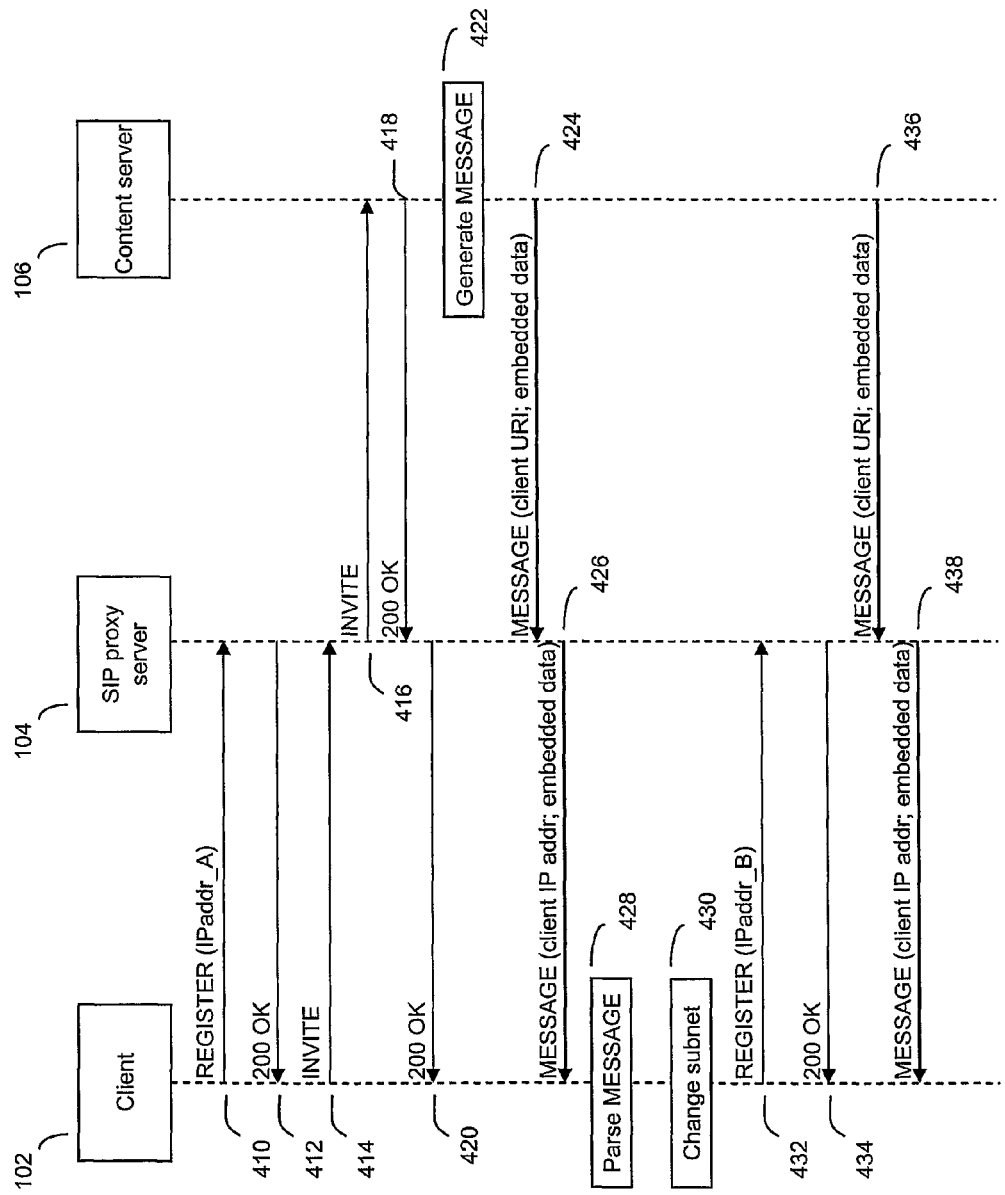
FIG. 4 is a message flow diagram of SIP based handover in an embodiment of the present invention.

The operation of these elements in the SIP user agent 300 will become apparent in the description of an embodiment of the present invention with reference to FIG. 4. References in FIG. 4 to the elements found in FIG. 1 are made using like reference numerals.

In the embodiment shown in FIG. 4, the client 102 is first located in subnet_A 110 and registers its IP address "IPaddr_A" with the SIP proxy server 104 by sending a SIP REGISTER message containing "IPaddr_A". The SIP proxy 104 registers "IPaddr_A" against the SIP URI of the client 102 "sip:fernando@bt.com" and replies with a SIP 200 OK message in step 412. These steps mirror steps 210 and 212 in FIG. 2.

The client 102 then makes a request to the content server 106 to stream some video clip or similar multimedia data in an embodiment of the present invention. The client does so by sending a SIP INVITE message to the content server 106, which is sent via the SIP proxy server 104 in step 414. The SIP INVITE message contains in its message body SDP information for defining the session content and data to be downloaded. Included in the SDP portion is an indicator that the request for download of data should be via a "SIP data session" according an embodiment of the present invention. This indicator may be in the form of a flag for example or other suitable indicator. The SIP INVITE message also includes a "Call-ID" field which is used to uniquely identify this call.

The SIP INVITE is passed via the SIP proxy server 104 onto the content server 106 in step 416. The content server parses the message using its SIP stack and detects the SIP data session indicator in the message. Thus, if the content server 106 is able to generate SIP data messages of the type requested by the client 106 and also obtain data from the relevant applications that provide the requested data for sending using the special SIP data messages, then it will acknowledge the request. In practice, this means that the content server 106 will require the functionality described in FIG. 3. In step 418, the content server 106 acknowledges the request from the client to download some requested data using a SIP data session with a SIP 200 OK message. The SIP 200 OK is sent via the SIP proxy server 104 and onto the client 102 in step 420.

Figure 5:
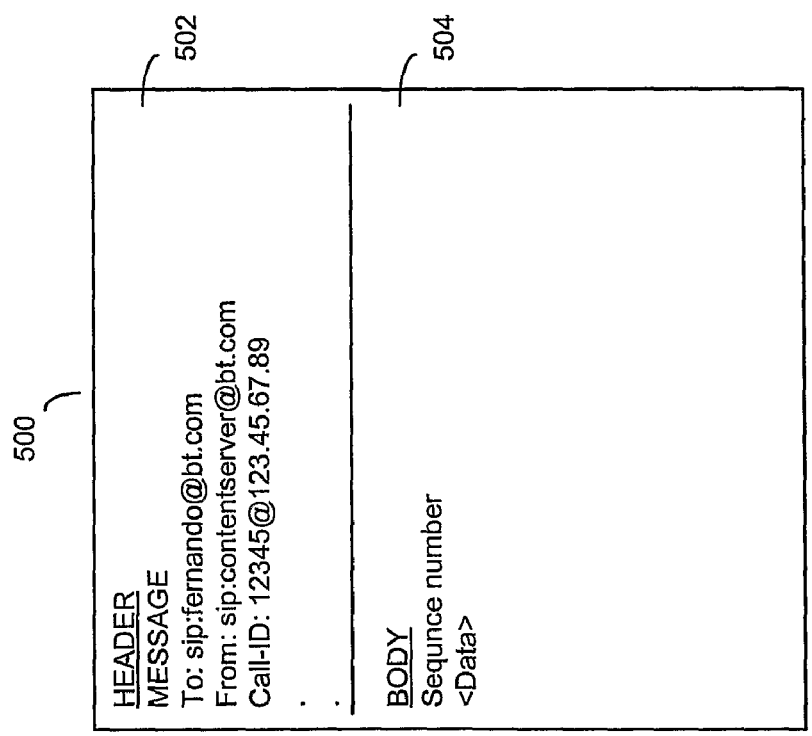
FIG. 5 is a diagram of a modified SIP message in an embodiment of the present invention.

The content server 106 now starts generating SIP MESSAGE messages in step 422, the content of which are illustrated in more detail in FIG. 5. FIG. 5 shows a SIP MESSAGE message 500 in an embodiment of the present invention. The message 500 includes a message header portion 502 and a message body portion 504. The message header 502 includes a "From" field containing the source (content server 102) URI and a "To" field containing the destination (client 102) URI. The header also contains the Call-ID corresponding to the initial SIP INVITE message received in step 416. The use of the same Call-ID advantageously provides a simple way of associating the message 500 with the original request set out in the SIP INVITE. This way, the client will know that the message is a SIP data session message and can process the message accordingly. The message body 504 contains both the data requested by the client 102 as well as a sequence number for the message. The data requested may be sent using a series of messages depending on the amount of data that needs to be sent. Hence, the sequence number is useful for managing any message sent by the content server 106 that is not received by the client 102 in the order in which it was sent in. This is even more important for data contained in the message that needs to be processed in a specific order.

The data contained in the message body 504 is obtained from the video application in the content server 106 via an application interface and is the data requested by the client 102 in step 416. The message 500 itself is generated specifically by the SIP stack in the content server 102.

As each SIP MESSAGE is created, it is sent to the URI of the client 102 via the SIP proxy server 104 in step 424. The SIP proxy server 104 reads the SIP MESSAGE header to obtain the destination of the message as given by the "To" field, which is the URI of the client 102 "sip:fernando@bt.com". This URI is checked against the mapping data held by the SIP proxy server 104 to determine the currently registered IP address associated with the URI. In this case, the SIP proxy server 104 determines the IP address of the client 102 to be "IPaddr_A" and thus forwards the SIP MESSAGE message to the client 102 to "IPaddr_A" in step 426.

In step 428, the client 102 receives and parses each SIP MESSAGE message using a SIP stack. The client 102 also contains elements similar to those outlined in FIG. 3, including a SIP stack for processing SIP messages. The SIP stack determines that the received message being parsed is of a SIP data session type either from the general message format or from the presence of a Call-ID matching that of the client's original SIP INVITE message requesting a SIP data session. The SIP stack then parses the message body to obtain the data embedded in it. If the message body contains a sequence number, then the SIP stack takes this into account when processing a series of received messages. For example, the SIP stack may buffer out-of-sequence data packets until the correctly sequenced data packet is received, and then process the data packets accordingly.

The process of generating, sending and parsing of SIP MESSAGE messages is repeated until all the data requested by the client 102 has been sent.

Meanwhile, during streaming of the data using the SIP MESSAGE messages as described above the client 102 moves from subnet_A 110 to subnet_B 112 in step 430. One consequence of moving subnet is that the client 102 is allocated a new IP address "IPaddr_B". This change in IP address is detected by the IP stack interface in the client and communicated to the SIP stack.

The SIP stack the initiates a re-registration process to inform the SIP proxy server 104 of the change in IP address. This is done in step 432, where a SIP REGISTER message identifying the new IP address "IPaddr_B" is sent to the SIP proxy server 104. The SIP proxy server 104 updates its mapping information for the SIP URI of the client 102 "sip:fernando@bt.com" with the new IP address "IPaddr_A" and replies with a SIP 200 OK message in step 434.

Meanwhile, content server 106 is still generating and sending data to the client 102 by embedding in the body of SIP MESSAGE messages. However, these messages are sent to the client 102 using the URI of the client 102 via the SIP proxy server 104 as in step 436. So once the SIP proxy server 104 is updated with the new IP address of the client 102, the SIP proxy server 104 can forward any SIP MESSAGE messages received from the content server 106 addressed to the URI of the client to the updated IP address in step 438. Thus, there is no need for the client 102 to do anything else following a change in the IP address other than sending a single SIP REGISTER message to the SIP proxy server 104.

Processing of the SIP MESSAGE messages by the client 102 after a change in IP address (handover) continues as before handover.

In the above embodiments, some of the SIP messages that will in practice be sent have been omitted. For example, SIP ACK messages are generally sent to respond to SIP 200 OK messages. However, as there messages are not considered to be essential to the invention have been omitted for simplicity.

In another embodiment of the present invention, the SIP stack in the client 102 includes intelligence to determine when a handover may be necessary before the handover actually takes place. For example, the SIP stack may obtain information from the IP stack interface relating to network conditions and other available networks/subnets, and initiate a "make before break" handover. In such a situation, the client can connect to a new subnet and be allocated a new IP address before the old IP address is released. This further reduces the already small window during which messages sent by the content server 106 may be routed by the SIP proxy server 104 to the incorrect (old) IP address. This information may be obtained using the IEEE 802.21 protocol which provides for such information based on which a user agent may initiate handovers.

The client 102 (or SIP stack) can also decide when a data session of the type described above is needed. For example, the user of the device may know that he is likely to be mobile and move around a lot, thereby increasing the probability bf requiring changes to his IP address. This can be communicated through a suitable interface on the client 102. This may be further supported by historical information gathered by the client 102 or from data relating to the network, such as knowledge that the network has many small subnets. For example, if the user does not think that a seamless handover is required and conditions support a low probability of handover, then the SIP data session as described above can be bypassed and data transfer using some other method such as RTP can be used instead.

Furthermore, the client 102 may be selectively offered this service by the network. For example, the service could be seen as a privileged service that is offered to only "gold" clients, or may be offered only in certain circumstances as determined by the network.

A person skilled in the art will appreciate that whilst the above examples refer to a content server sending messages to a client, various specific end point devices can be used in their place, as long as they are able to send and receive SIP messages.

For example, the client 102 may be a SIP phone and the content server 106 replaced with another SIP phone. Thus, one SIP phone may invite the other SIP phone to video call (steps 414 to 420). After step 420, both SIP phones may generate and send SIP MESSAGE messages to communicate with each other. When either SIP phones changes IP address, then that SIP phone just needs to re-register as in steps 432 and 434 for subsequent MESSAGE messages to be forwarded accordingly to the new IP address. Thus, the users of both SIP phones will be able to enjoy a seamless conversation.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of handling a data stream during a handover in a communications network comprising a first user agent having a SIP universal resource indicator, a proxy server and a second user agent, said method comprising:
   (i) mapping at the proxy server the SIP universal resource indicator with a dynamic network address allocated to the first user agent;
   (ii) sending a request by the first user agent to the second user agent for a data stream;
   (iii) generating by the second user agent in response to the request a plurality of messages each comprising part of the data stream requested and the SIP universal resource indicator of the first user agent, wherein the messages are SIP messages, and sending the messages to the proxy server;
   (iv) receiving the messages at the proxy server and determining the mapped dynamic network address corresponding to the SIP universal resource indicator in the received messages, and forwarding the messages to the determined dynamic network address; and
   (v) when the first user agent is allocated a new dynamic network address, replacing by the proxy server the mapped dynamic network address with the new dynamic network address and forwarding the received messages to the new dynamic network address.

2. A method as claimed in claim 1, wherein the dynamic network address is an IP address.

3. A method as claimed in claim 1, wherein the new dynamic network address results from the first user agent moving from a first subnet to a second subnet.

4. A method as claimed in claim 1, wherein the new dynamic network address results from a change in location.

5. A method as claimed in claim 1, wherein each message comprises a message header and message body, and the data stream is embedded in the message body and SIP universal resource indicator is in the message header.

6. A method as claimed in claim 1, wherein the request comprises a call identifier and each generated message comprises the same call identifier.

7. A method as claimed in claim 1, wherein the first user agent parses each message from the proxy server in dependence on the call identifier in each message.

8. A method as claimed in claim 1, wherein each generated message includes a sequence number to indicate a preferred order for the message to be processed by the first user agent.

9. A method according to claim 1, wherein the first user agent maintains the first dynamic network address until the second dynamic network address is allocated and registered with the proxy server.

10. A method according to claim 1, wherein the first and second user agents are SIP devices.

11. A method of operating a proxy server during a handover in a communications network including a first user agent having a SIP universal resource indicator, the proxy server and a second user agent, said method of operating the proxy server comprising:
    mapping the SIP universal resource indicator with a dynamic network address allocated to the first user agent;
    receiving a plurality of messages from the second user agent, the messages being responsive to a request by the first user agent to the second user agent, each of the messages comprising part of a requested data stream and the SIP universal resource indicator of the first user agent, and the messages being SIP messages;
    determining the mapped dynamic network address corresponding to the SIP universal resource indicator in the received messages;
    forwarding the messages to the determined dynamic network address; and
    replacing the mapped dynamic network address with a new dynamic network address when the first user agent is allocated the new dynamic network address and forwarding the received messages to the new dynamic network address.

12. A method as claimed in claim 11, wherein the dynamic network address is an IP address.

13. A method as claimed in claim 11, wherein the new dynamic network address results from a change in location.

14. A method as claimed in claim 11, wherein each message comprises a message header and message body, and the data stream is embedded in the message body and SIP universal resource indicator is in the message header.

15. A method according to claim 11, wherein the first and second user agents are SIP devices.

16. A proxy server operable as part of a communications network with a first user agent having a SIP universal resource indicator and a second user agent, the proxy server comprising:
    an input configured to receive a plurality of messages from the second user agent, the messages being responsive to a request by the first user agent to the second user agent, each of the messages comprising part of a requested data stream and the SIP universal resource indicator of the first user agent, and the messages being SIP messages;
    a processing system configured to:
      map the SIP universal resource indicator with a dynamic network address allocated to the first user agent;
      determine the mapped dynamic network address corresponding to the SIP universal resource indicator in the received messages; and
    an output configured to forward the messages to the determined dynamic network address;
    wherein the processing system is further configured to replace the mapped dynamic network address with a new dynamic network address when the first user agent is allocated the new dynamic network address, and the output is further configured to forward the received messages to the new dynamic network address.

17. The proxy server of claim 16, wherein the dynamic network address is an IP address.

18. The proxy server of claim 16, wherein the new dynamic network address results from a change in location.

19. The proxy server of claim 16, wherein each message comprises a message header and message body, and the data stream is embedded in the message body and SIP universal resource indicator is in the message header.

20. The proxy server of claim 16, wherein the first and second user agents are SIP devices.

* * * * *